G. P. HEWIS.
INDICATOR FOR FLUID CONTAINERS.
APPLICATION FILED JULY 21, 1916.
1,224,741.
Patented May 1, 1917.
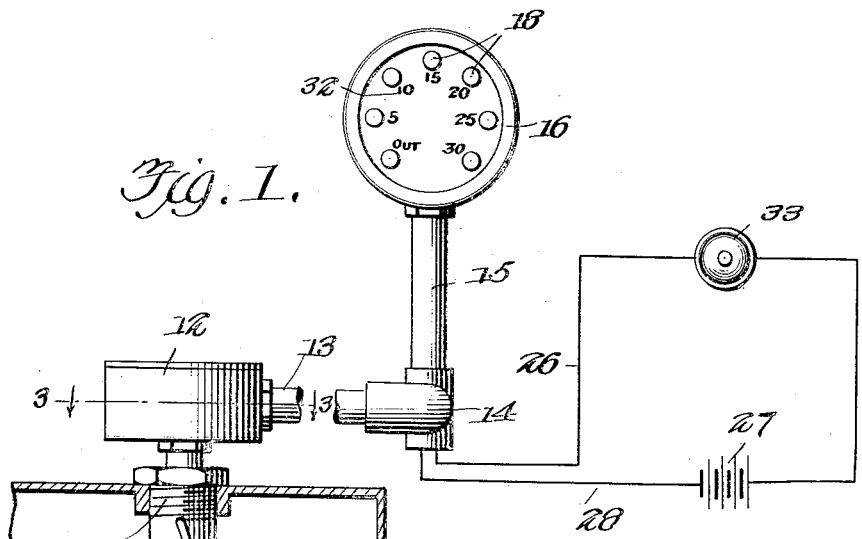
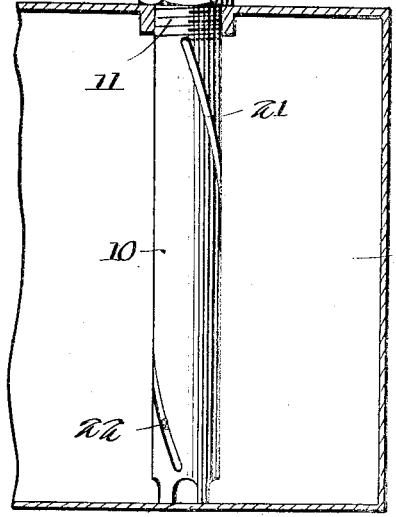
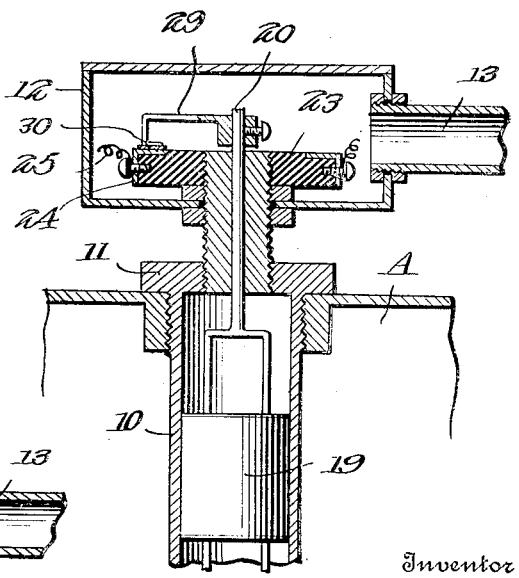
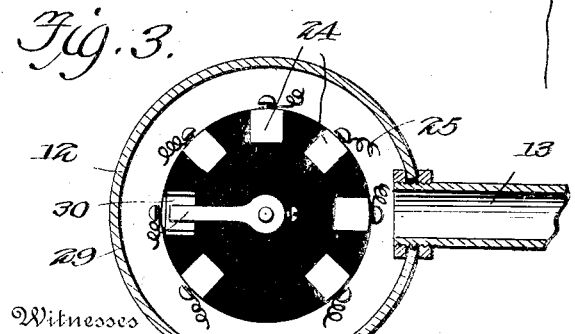
Inventor
G. P. Hewis,
By Victor J. Evans
Attorney

UNITED STATES PATENT OFFICE.

GEORGE PATRICK HEWIS, OF REGINA, SASKATCHEWAN, CANADA.

INDICATOR FOR FLUID-CONTAINERS.

1,224,741.    Specification of Letters Patent.    Patented May 1, 1917.

Application filed July 21, 1916.   Serial No. 110,612.

*To all whom it may concern:*

Be it known that I, GEORGE P. HEWIS, a citizen of the United States of America, residing at Regina, in the Province of Saskatchewan and Dominion of Canada, have invented new and useful Improvements in Indicators for Fluid-Containers, of which the following is a specification.

The invention relates to indicators, and more particularly to the class of electromechanical indicators for fluid containers.

The primary object of the invention is the provision of an indicator of this character wherein it is especially designed for use in motor vehicles so that the operator thereof can determine at a glance the amount of gasolene contained within the tank when the occasion may require.

Another object of the invention is the provision of an indicator of this character wherein a circuit closer is controlled by a float which is governed by the quantity of liquid within a tank or receptacle and said closer controls the circuit to a series of lamps which are illuminated on the closing of the particular circuit for enabling one to determine the quantity of liquid within the tank or receptacle, the float being mounted and movable in a novel manner and also the said circuit closer is of novel construction, which is so arranged and correlated with the float as to reduce the possibility of derangement to a minimum.

A further object of the invention is the provision of an indicator of this character wherein the same can be used in connection with a liquid tank, reservoir or like receptacle and will automatically indicate or register the level of liquid in said tank or reservoir at all times and will enable an attendant to have knowledge of the quantity of liquid remaining in the tank or reservoir.

A still further object of the invention is the provision of an indicator of this character which is extremely simple in construction, readily and easily mounted upon a reservoir or the like for determining the quantity of liquid therein, thoroughly reliable and efficient in operation and inexpensive in manufacture and installation.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the accompanying drawings:

Figure 1 is an elevation of a tank showing the indicator constructed in accordance with the invention applied;

Fig. 2 is an enlarged fragmentary vertical sectional view through a portion of the indicator;

Fig. 3 is a sectional view on the line 3—3 of Fig. 1.

Similar reference characters indicate corresponding parts throughout the several views of the drawings.

Referring to the drawings in detail, A designates a liquid tank which may be of any desirable construction, and fitted thereto is the indicator which comprises a float tube or casing 10, the upper end of which is formed with an externally threaded plug connection or terminal 11 which detachably engages in a suitable threaded opening formed in the top of the tank A so that the tube or casing 10 will depend the required distance therein, and supported upon this connection or terminal 11 is a boxing or shell 12 in which is adapted to be arranged the circuit closer hereinafter fully described.

Leading from one side of the boxing or shell 12 and suitably tapped therein is a pipe 13 which may be of the required length and is also tapped into a T-union 14 which has tapped therein at right angles to the pipe 13 a hollow standard 15 on which is mounted an indicator head 16 carrying therein lamp sockets 17 in which are mounted electric bulbs 18 illuminated from an electric circuit hereinafter fully described.

Arranged within the tube 10 is a float 19 which is non-rotatable upon and is slidable on a spindle 20 centrally of the tube or casing 10 and extended within the boxing 12, while formed in the said tube or casing 10 is a spiral slot 21 in which engages a guide pin 22 mounted in the float 19 so that on the rise and fall of the float within the tube or casing 10 the spindle 20 will be turned, the rise and fall of the float 19 being effected by the level of the liquid contained within the tank A, as will be obvious.

Within the boxing or shell 12 is the circuit closer which comprises a disk 23 made from insulating material and upon which are arranged a series of contacts 24 from which extend the circuit wires 25 which are trained through the pipe 13, union 14, post 15, and into the head 16 to energize the bulbs 18, a wire 26 being trained through the post 15 and union 14 to a dry cell battery or batteries 27, while leading from the latter is the circuit wire 28, the same being trained through the union 14 and pipe 13 into the head 12 where it is connected to a circuit closing arm 29 fixed to the spindle 20 and carrying a contact wiper or brush 30 which engages with the respective contacts 24, it being understood, of course, that the remaining lamps of the series are tapped to the wire 26 through the medium of wires so that when the wiper or brush 30 rides upon any one of the contacts 24 a particular lamp 18 will be illuminated, the lamps of the series being marked or otherwise indicated with suitable indicia 32 so as to be indicative of a predetermined level of the liquid contained within the tank A and thereby make visible to an operator the exact level of the liquid, as will be obvious. Arranged within the circuit wire 28 is a normally open push button switch 33 so that the circuit to any one of the lamps in the series will not become illuminated until the switch 33 is closed, and in this manner the electric circuit is under constant control by an operator.

The float 19 moves the circuit closing arm 29 by rotating the same for the movement of the wiper or brush 30 over the contacts 24 within the boxing or shell 12 and said circuit closer controls the circuit for each lamp which is illuminated on the closing of the switch 33 by an operator, the said switch being located in convenient reach of an operator. It is, of course, understood that the indicator is especially designed for use in motor vehicles and in this event the indicator head 16 and the switch 33 is mounted upon the dash of the vehicle forwardly and in convenient reach of the operator of the vehicle, while the tube or casing 10 with the boxing or shell 12 is mounted upon the gasolene tank A wherever the same may be placed within the vehicle, the connection between the indicator head 16 and the shell or boxing 12 being such as to permit the proper installation of the indicator within the vehicle. The switch 33 in connected to the circuit of the light and is pressed only when it is desired to find out how much gasolene is in the tank and is used to avoid continuous lighting of the light in the series. It is understood, of course, that each consecutive light is lighted one at a time so that the operator or other person may be readily notified of the depth of gasolene in the tank, and this is effected only when the switch 33 is closed.

From the foregoing description, taken in connection with the accompanying drawings, the construction and manner of operation of the herein described indicator will be readily apparent and, therefore, a more extended explanation has been omitted.

Having thus described my invention, I claim:

The combination with a container, of a stationary tubular guide therein having a spiral guideway, a rotary shaft extending longitudinally of said tubular guide and projecting outside of the container, a buoyant runner movable longitudinally within said tubular guide and having means in engagement with said spiral guideway whereby a partial rotary movement is imparted, the latter being slidable on said shaft and so related thereto as to impart a corresponding partial rotary movement to said shaft, an arm located exteriorly of said container and having a fixed relation to the projecting part of said shaft, and electric circuit controlling means embodying a stationary member having an arcuate series of contacts, and another contact on said arm adapted to sweep over said arcuate series of contacts.

GEORGE PATRICK HEWIS.